United States Patent Office 3,686,257
Patented Aug. 22, 1972

3,686,257
DITHIOCARBONIC ACID O-ETHYL-S-2-[2(p-CHLOROPHENYLMERCAPTO) - 3 - CHLOROPROPYL] ESTERS
Gerhard Schrader, Wuppertal-Cronenberg, and Gunther Hermann, Leverkusen, Germany, assignors to Farbenfabriken Bayer Aktiengesellschaft, Leverkusen, Germany
No Drawing. Filed May 26, 1970, Ser. No. 40,735
Claims priority, application Germany, May 30, 1969,
P 19 27 640.5
Int. Cl. C07c *154/02*
U.S. Cl. 260—455 B                                    1 Claim

ABSTRACT OF THE DISCLOSURE

Dithiocarbonic acid O-ethyl-S-[2 - (p-chlorophenylmercapto)-chloropropyl] ester which possess rodent-, leporine animal- and ruminant- repellent properties, and which may be produced by conventional methods.

---

The present invention relates to and has for its objects the provision for the particular new dithiocarbonic acid O-ethyl-S-[2 - (p-chlorophenylmercapto) - 3 - chloropropyl] ester; which possess rodent-, leporine animal- and ruminant-repellent properties, active compositions in the form of mixtures of such compound with solid and liquid dispersible carrier vehicles, and methods for producing such compound and for using such compound in a new way, especially for repelling warm-blooded creatures such as rodents, leporine animals and ruminants, and the like, with other and further objects becoming apparent from a study of the within specification and accompanying examples.

It is already known that zinc dimethyldithiocarbamate (A) and tetramethylthiouram disulfide (B) can be used for repelling rodents, leporine animals and ruminants.

These two active compounds have attained a considerable importance in commercial practice (J. F. Welch, Proceedings Third Vertebrate Pest Conf., San Francisco, 1967, pp. 36–40).

It has now been found, in accordance with the present invention, that the particular new dithiocarbonic acid O-ethyl-S-[2 - (p-chlorophenylmercapto) - 3 - chloropropyl] ester of the formula

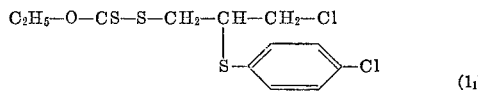

(1₁)

exhibits a distinct repellent effect against rodents, leporine animals and ruminants.

It has further been found, in accordance with the present invention, that the production of the compound of Formula 1 above may be provided by the process which comprises reacting a 1-halogen-2-(p-chlorophenylmercapto)-3-chloropropane of the formula

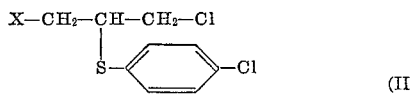

(II)

in which X stands for chlorine or bromine
with a salt of O-ethyldithiocarbonic acid (xanthic acid) of the formula $$C_2H_5\text{—}O\text{—}CS\text{—}SM \quad \text{(III)}$$

in which M stands for an alkali metal or alkaline earth metal equivalent or an ammonium group.

Surprisingly, the repellent effect of the active compound of Formula 1 according to the invention is higher than that of the known rodent and ruminant repellents tertamethylthiouram disulphite (B) and zinc dimethyldithiocarbamate (A).

The new compound according to the present invention therefore represents a valuable contribution to the art.

When, for the preparation of the compound according to the present invention, 1-bromo-2-(p-chlorophenylmercapto) - 3 - chloropropane and potassium O-ethyldithiocarbonate are used as starting materials, the reaction course can be represented by the following formula scheme:

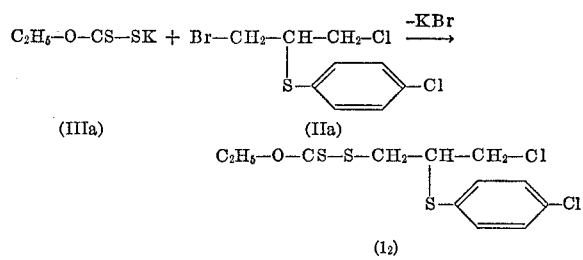

The starting materials are defined within narrow limits by the above Formulae II and III.

The salts of the Formula III to be used as starting materials are generally known.

The 1 - halogen-2-(p-chlorophenylmercapto)-3-chloropropanes of the Formula II to be used as starting materials are likewise known; they can be prepared by reaction of allyl halide with p-chlorophenylsulfonic acid chloride in a chlorinated hydrocarbon, such as methylene chloride or carbon tetrachloride, at room temperature.

The reaction according to the present invention can be carried out in the presence of a solvent (which term includes a mere diluent). Those polar solvents are suitable which are inert. Preferred examples include esters, such as ethyl acetate; ketones, such as acetone; nitriles, such as acetonitrile; and formamides, such as dimethyl formamide.

The reaction temperature can be varied within a wide range; in general, the reaction is carried out at substantially between about 10–90° C., preferably between about 40–60° C.

The reaction according to the present invention is preferably effected with equimolar amounts of the reactants, but deviations of up to 20% are possible without substantial diminution of yield.

The active compound according to the present invention exhibits a repellent effect against destructive leporine animals (Lagomorpha) and rodents (Rodentia), such as squirrel-like animals (Sciuroidae), gophers (Geomyoidae) and mouse-like animals (Muroidae) with which there are classed essentially the dormouse-like animals (Muscardinidae) and the mice (Muridae); and the like.

The leporine animals contemplated herein include essentially the Leporidae, such as the rabbit (*Oryctolagus cuniculus*), the squirrel-like animals e.g. the European souslik (*Citellus citellus*) and the ground squirrel (*Citellus lateralis*), and the gophers include e.g. the mountain pocket gopher (*Thomomys talpoides*); and the like. With the dormouse-like animals contemplated herein there is classed e.g. the fat dormouse (*Glis glis*), and the like, whereas the mice contemplated herein comprise essentially, in the group of the long-tailed mice (Murinae), the rats (Rattus spec.), such as the black rate (*Rattus rattus*) and the Normay rat (*Rattus norvegicus*); the house mice (Mus spec.), such *Mus musculus;* in the group of the hamster-like animals (Cricetinae) the European hamster (*Cricetus cricetus*) and in the group of the short-tailed mice (Microtinae) e.g. the common vole (*Microtus arvalis*), the field vole (*Microtus agrestis*) and the water vole (*Arvicola terrestris*); and the like.

The active compound according to the present invention also repels destructive ruminants (Ruminantia), as the most important groups of which the deer (Cervidae) and the horned animals (Bovidae), and the like are to be mentioned.

With the deer contemplated herein are classed e.g. the roe deer (*Capreolus capreolus*), the Virginia deer (*Odocoileus spec.*), the fallow deer (*Dama dama*), the wapiti (*Cervus canadensis*) and the red deer (*Cervus elaphus*), and the like. Among the horned animals contemplated herein, there belong to the group of the chamois-like animals (Rupicaprinae) particularly to sheep (Ovis spec.) and the goats (Capra spec.), and the like.

The active compounds according to the instant invention can be utilized, if desired, in the form of the usual formulations or compositions with conventional inert (i.e. plant compatible or herbicidally inert) pesticide (or pest- or warm-blooded creature-repellent) diluents or extenders, i.e. diluents or extenders of the type usable in conventional pesticide formulations or compositions, e.g. conventional pesticide (or pest- or warm-blooded creature-repellent) dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide (or pest- or warm-blooded creature-repellent) dispersible liquid diluent carriers and/or dispersible solid carriers optionally with the use of carrier vehicle assistants, e.g. conventional pesticide (or pest- or warm-blooded creature-repellent) surface active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other repellents, or nematocides, acaricides, insecticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.01–95%, and preferably 0.05–90%, by weight of the mixture, whereas carrier composition mixtures suitable for direct application or field application generally contemplate those in which the active compound is present in an amount substantially between about 0.01–95%, and preferably 0.05–80%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.01–95%, and preferably 0.05–80%, by weight of the mixture.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In particular, the present invention contemplates methods of repelling warm-blooded creatures or animals, i.e. pests, and specifically rodents, leporine animals and ruminants, which comprise applying to the area, material, place, and the like, from which such warm-blooded creatures are to be repelled, i.e. the locus to be protected or any and all things or matter which are susceptible to damage by (e.g. by eating, gnawing, biting, trampling, etc.) and/or from which such pest creatures are to be repelled, a correspondingly repellent effective amount, i.e. a warm-blooded creature repellent effective amount, of the particular active compound of the invention alone or together with a carrier vehicle as noted above. The instant formulations or compositions are applied in the usual manner, for instance by spraying, atomizing, vaporizing, squirting, scattering, dusting, watering, sprinkling, pouring, and the like.

More specifically, application of the active compounds according to the present invention, their formulations and the application forms prepared therefrom is effected in the normal way, e.g. by seed treatment, by spraying, dusting or scattering of suitable preparations of the active compound on plants or parts of plants endangered or jeopardized by rodent damage and/or damage by ruminants (including damage by game), by soil treatment, by fumigation in rooms or subterranean structures, by aboveground or underground application of repellent coatings and barriers and by impregnation of materials which may be endangered or jeopardized by rodents and/or ruminants, such as wood, paper, rubber and synthetic materials.

For seed treatment, e.g. seed dressing, in general substantially between about 0.01–5 parts, preferably between about 0.025–1 parts, by weight of active compound are used per 100 parts by weight of seed, e.g. in g. per 100 g. of seed, i.e. plantable or agricultural crop seed—regardless of the presence or absence of such carrier vehicle.

Spray liquors or pastes usable for the achievement of rodent-repellent and ruminant-repellent coatings, e.g. on endangered or jeopardized plants or parts of plants, contain, in general, substantially between about 0.1–20%, and preferably between about 0.5–10%, by weight of active compound. Materials which are soaked with the active compounds should have in the surface layer thereof a concentration of active compound of substantially between about 0.1–5% by weight.

It will be realized, of course, that the concentration of the particular active compound utilized in admixture with the carrier vehicle or seed may vary within a fairly wide range and will depend upon the intended application as the artisan will appreciate. Therefore, in special cases it is possible to go above or below the aforementioned concentration ranges.

The outstanding effectiveness of the particular compounds usable according to the present invention is illustrated, without limitation, by the following examples.

EXAMPLE 1

Repellent test/deer mouse

Test animal: North American deer mouse (*Peromyscus maniculatus*)
Solvent: acetone
Concentration of active compound in test food: 2%

To prepare a suitable preparation of the particular active compound, 2 parts by weight of such active compound are dissolved in as small as possible an amount of the solvent stated above, this solution is mixed intimately with 98 parts by weight of wheat seed, and the solvent is allowed to evaporate so as to form treated wheat seed grains.

5 individually kept deer mice receive, on each of 3 successicve days, besides a disliked standard food, in each case 25 treated grains of wheat. The number of grains eaten by each animal is recorded daily.

As a measure of the repellent effect, there serves the reduction of food intake, i.e. the percentage by which the actual feeding (as a percentage of the total amount of wheat offered) is lessened with respect to the 100% feeding always to be expected in the case of untreated wheat. 100% lessening of feeding denotes that no wheat grains at all have been eaten, the repellent effect therefore being total. The values stated comprise the feeding result of all test animals during the entire experiment.

The particular active compounds tested, the number of individual tests and the results obtained can be seen from Table 1.

TABLE 1.—REPELLENT TEST/DEER MOUSE

| Active compound | Number of individual experiments | Lessening of feeding, percent |
| --- | --- | --- |
| (A) Zinc dimethyldithiocarbamate (known) | 1 | 31.5 |
| (1₃) $C_2H_5-O-\overset{S}{\overset{\|}{C}}-S-CH_2-CH(S-C_6H_4-Cl)-CH_2-Cl$ | 1 | 64.0 |

EXAMPLE 2

Repellent test/house mouse

Test animal: white laboratory mouse (*Mus musculus*)
Concentration of active compound in test food: 0.5%

To produce a suitable preparation of the particular active compound, 3 parts by weight of such active compound are mixed with 2.8 parts by weight of highly dispersed silicic acid and 4.2 parts by weight of talc. To prepare the test bait, 1.67 parts by weight of the resulting active compound concentrate are intimately mixed with 95 parts by weight of a standard mealy food customary for feeding experimental animals, with the addition of 3.33 parts by weight of methyl cellulose. From 6 g. of the resulting dry substance, two spherical bait pellets are formed by adding a little water which are dried at room temperature for 24 hours before commencement of the experiment.

These pellets are placed for 24 hours, without other food, before two white laboratory mice kept together. Water is freely available. The residues of the pellets are dried and weighed again after the experiment has ended.

There is valid as a measure of the repellent effect the residual amount weighed back, expressed as a percentage of the amount originally used. 100% repellent effect means that nothing at all of the pellets has been eaten.

The particular active compounds tested, the number of experiments and the results obtained can be seen from the following Table 2.

TABLE 2.—REPELLENT TEST/HOUSE MOUSE

| Active compound | Number of individual experiments | Repellency in percent (average value) |
| --- | --- | --- |
| (B) Tetramethylthiouram disulfide (known) | 3 | 67.8 |
| (1₄) $H_5C_2\cdot O\cdot\overset{S}{\overset{\|}{C}}-S-CH_2\cdot CH(S-C_6H_4-Cl)\cdot CH_2\cdot Cl$ | 3 | 83.9 |

EXAMPLE 3

Enclosed open-air area test/black-tailed deer

Test animal: Black-tailed deer (*Odocoileus columbianus*)

To produce a suitable preparation of the particular active compound, 6 parts by weight of such active compound and 10 parts by weight of a copolymer of methacrylic acid methyl ester and butadiene as adhesion promoter are dispersed in 84 parts by weight of water. Two-year-old Douglas fir seedlings (*Pseudotsuga taxifolia*) 18–30 cm. high are totally immersed in the given preparation of active compound. After drying, the plants are covered all over with a thin layer of the adhesive containing active compound and planted in a game enclosure of 1.01 hectares. Inside the enclosed open-air area, ten test plots are laid out in each of which there are twenty seedlings which are treated with the given active compound, twenty seedlings which are treated with the standard agent tetramethylthiouram disulphide (TMTD) and 20 seedlings which are untreated and which serve as control.

The game enclosure is now occupied by ten black-tailed deer. The test proceds until intermediate checks show a damage of 60–80% in the case of the untreated seedlings. Then the average degree of damage is determined. 100 means that all the seedlings have been damaged, whereas 0 means that none of the seedlings have been damaged.

The particular active compounds tested, dosages, number of treated seedlings and average degrees of damage can be seen from the following Table 3.

The following example is set forth to illustrate, without limitation, the manner of producing the instant active compound according to the present invention.

TABLE 3.—ENCLOSED OPEN-AIR AREA TEST/BLACK-TAILED DEER

| Active compound | Dosage of active compound in treatment medium, in percent | Number of treated seedlings | Average degree of damage |
| --- | --- | --- | --- |
| (B) Tetramethylthiouram disulphide (known) | 6 | 200 | 64.42 |
| Untreated control | | 200 | 72.41 |
| (1₅) 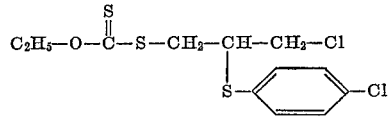 | 6 | 200 | 17.54 |

EXAMPLE 4

Enclosed open-air area test/snowshoe rabbit

Test animal: Snowshoe rabbit (*Lepus bairdi*)

To produce a suitable preparation of the particular active compound, 6 parts by weight of the given active compound and 10 parts by weight of a copolymer of methacrylic acid methyl ester and butadiene as adhesion promoter are dispersed in 84 parts by weight of water. Two-year-old Douglas fir seedlings (*Pseudotsuga taxifolia*) 18–30 cm. high are totally immersed in the preparation of the given active compound. After drying, the plants are covered all over with a thin layer of the adhesive containing the given active compound and planted in a game enclosure of 0.41 hectare. Inside the enclosed open-air area, ten test plots are laid out in each of which there are twenty seedlings which are treated with the given active compound, twenty seedlings which are treated with the standard agent tetramethylthiouram disulphide (TMTD) and twenty seedlings which are untreated and serve as control.

The game enclosure is now occupied by ten snowshoe rabbits. The test proceeds until intermediate checks show a damage of 60–80% in the case of the untreated seedlings. Then the average degree of damage is determined. 100 means that all the seedlings have been damaged, whereas 0 means that none of the seedlings have been damaged.

The particular active compounds tested, dosages, number of treated seedlings and average degrees of damage can be seen from the following Table 4.

EXAMPLE 5

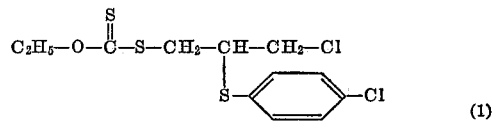 (1)

80 g. (0.5 mol) potassium xanthate are dissolved in 400 ml. acetonitrile. To this there are added at 10° C., with stirring, 150 g. (0.5 mol) 1-bromo-2-(p-chlorophenylmercapto)-3-chloropropane of B.P. 118° C./0.01 mm. Hg. Heating to 60° C. is effected for 2 hours, and the reaction product is then put into 400 ml. of ice water. The organic phase is then stirred out with 300 ml. benzene. The benzene solution is separated, washed with water and dried over sodium sulfate. The solvent is drawn off under reduced pressure and there are obtained in this manner 160 g. dithiocarbonic acid O-ethyl-S-[2-(p-chlorophenylmercapto)-3-chloropropyl] ester in the form of a pale yellow, water-insoluble oil with the refractice index $n_D^{23}=1.6232$. Yield: 94% of the theory.

It will be realized that the foregoing compound contemplated by the present invention possess the desired warm-blooded creature or animal repellent properties for repelling rodents, leporine animals and ruminants, and that such compound has not only a very slight toxicity toward warm-blooded creatures, but also a concomitantly low phytotoxicity.

It will be appreciated that the instant specification and examples are set forth by way of illustration and not limitation, and that various modifications and changes may be made without departing from the spirit and scope of the present invention.

TABLE 4.—ENCLOSED OPEN-AIR AREA TEST/SNOWSHOE RABBITS

| Active compound | Dosage of active compound in treatment medium, in percent | Number of treated seedlings | Average degree of damage |
| --- | --- | --- | --- |
| (B) Tetramethylthiouram disulphide (known) | 6 | 200 | 14.31 |
| | 3 | 200 | 20.76 |
| Untreated control | | 200 | 80.90 |
| (1₆) 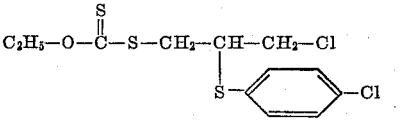 | 3 | 200 | 14.46 |

What is claimed is:
1. Dithiocarbonic acid O-ethyl-S-[2-(p-chlorophenylmercapto)-3-chloropropyl] ester of the formula
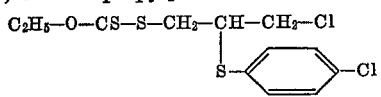
References Cited
UNITED STATES PATENTS
| | | | |
|---|---|---|---|
| 3,150,119 | 9/1964 | Hoffenberg et al. | 260—455 B |
| 3,126,405 | 3/1964 | Losco et al. | 260—455 B |
| 2,381,483 | 8/1945 | Blake et al. | 260—455 B |
| 2,861,913 | 11/1958 | Wegler et al. | 260—455 B |
| 2,608,573 | 8/1952 | Fischer | 260—455 B |
OTHER REFERENCES
Smith et al. "Tick Repellents" (1946), CA 40 p. 6205 (1946).
LEWIS GOTTS, Primary Examiner
G. HOLLRAH, Assistant Examiner
U.S. Cl. X.R.
424—30, 301